Oct. 27, 1970 P. MUCHNICK 3,536,987
CURRENT REGULATED POWER SUPPLY HAVING AMPLIFIER
BREAKDOWN PREVENTION DIODE
Filed Sept. 20, 1968 3 Sheets-Sheet 1

INVENTOR
PAUL MUCHNICK
BY Herbert W. Arnold
ATTORNEY

INVENTOR
PAUL MUCHNICK
BY Herbert W. Arnold
ATTORNEY

INVENTOR
PAUL MUCHNICK
BY Herbert W. Arnold
ATTORNEY

United States Patent Office 3,536,987

Patented Oct. 27, 1970

3,536,987
CURRENT REGULATED POWER SUPPLY HAVING AMPLIFIER BREAKDOWN PREVENTION DIODE

Paul Muchnick, Norwalk, Conn., assignor to Raytheon Company, Lexington, Mass., a corporation of Delaware Filed Sept. 20, 1968, Ser. No. 761,122
Int. Cl. G05f 1/56
U.S. Cl. 323—4 12 Claims

ABSTRACT OF THE DISCLOSURE

An amplifier breakdown prevention diode which is utilized in connection with a differential amplifier to prevent current mode regulation degeneration of the output load current in a power supply which regulates in both the constant voltage and constant current modes with automatic crossover between the modes. The use of the diode conducts unwanted current flow away from the current sensing resistor and permits the reference voltage of the power supply to be increased without the danger of current mode regulation degeneration, thereby providing improved characteristics with relaxed specifications on the amplifier transistors.

BACKGROUND OF THE INVENTION

This invention relates generally to regulated power supplies, and more particularly to improved circuit means for the prevention of current mode regulation degeneration in a power supply which regulates in both the constant voltage and constant current modes with automatic crossover between the modes, or in a power supply that operates in a constant current mode and has means for detecting and operating upon an overvoltage condition.

The input stage of a power supply amplifier is generally a differential amplifier. Quite often, the power supply is adapted to regulate in both the constant voltage and constant current modes with automatic crossover. To achieve this operation, a current monitoring or sensing resistor is often incorporated in the circuit in series with input and output terminals of the supply for providing a control signal proportional to load current. This control signal is fed to the input of the current mode differential amplifier. The output of this differential amplifier is coupled to the control electrode of a series transistor, or a pass transistor, as it is sometimes called. The series pass transistor is connected in series with the sensing resitor for limiting output current. An independent reference voltage for the power supply is provided for developing the comparison reference signal for the current mode amplifier.

For sensing in the voltage mode, sensing resistors in the form of a voltage divider for generating a comparison or sampling voltage are connected to an input of the voltage mode differential amplifier, to provide a basis for comparison with an independently generated voltage reference in order to control the voltage output of the supply in conjunction with the series pass transistor. This combination of differential amplifiers in both the voltage mode and current mode constitutes the basis of a constant current and constant voltage power supply with automatic crossover. One particular circuit for generating a control signal in the voltage and current modes and for crossing over from one mode to the other when preset threshold values of voltage and current are exceeded, is set forth in detail in U.S. Pat. No. 3,305,764 of Paul G. Todd. The control circuit shown in the patent is similar to control circuits used in present power supplies.

One of the problems which arises in regulated power supplies of this sort occur during operation when the load current exceed the threshold value of the current mode differential amplifier, as detected by the sensing resistor. At this point, the power supply enters the current mode and, as is well known, the output voltage falls in order to maintain the current. The lowered voltage output is applied to one side of the voltage mode differential amplifier, as previously described, while the voltage reference is applied to the other side. This creates an unbalanced input voltage condition that goes uncorrected due to the fact that the voltage mode amplifier no longer is controlling the output voltage. When the load current is sufficiently high, this unbalanced voltage may become great enough to drive one transistor of the differential amplifier toward heavy forward conduction, and reverse bias the other differential amplifier transistor toward Zener breakdown conduction due to the inherent manner in which a differential amplifier is constructed. When breakdown occurs, a relatively large current is able to flow through the base-emitter junctions of each transistor of the voltage mode differential amplifier and through the current sensing resistor, completing a path not normally present. This current through the sensing resistor is then sensed as a load change and corrected for, thereby resulting in deterioration or degeneration of the output load current regulation. Attempts to prevent the occurrence of such breakdown in the differential amplifier by the substitution of transistors with large Zener breakdown characteristics, such as the use of germanium or silicon units, have proved to be either costly or disadvantageous due to the relatively small temperature range of useful operation.

Accordingly, it is an object of the present invention to provide a novel circuit for protecting a transistorized, regulated voltage-current power supply from current mode regulation deterioration.

Another object of the invention is to provide an improved power supply circuit which protects against breakdown in power supply elements, such as across transistor junctions in a differential amplifier, so as to permit the reference voltage to be increased to obtain improved performance without the danger of current mode deterioration.

A further object of the present invention is to provide an improved protection circuit for a power supply that is relatively simple in construction and operation, and yet highly efficient in use.

SUMMARY OF THE INVENTION

In accordance with the present invention, the foregoing objects and related advantages are attained in an improved circuit for prevention of voltage breakdown that may be incorporated in a typical transistorized current regulated power supply. In particular, protection against current mode degeneration due to transistor junction breakdown of a differential amplifier in a voltage-current mode regulated power supply is achieved electronically by the addition of a normally nonconducting diode from the voltage sensing input of the voltage mode differential amplifier to the input or power supply side of the current sensing resistor, and poled so that current flows from the voltage sensing input of the differential amplifier and from the comparison voltage divider connected thereto through the diode, and bypasses the undesired current resulting from conduction of said diode around the series sensing resistor. The input voltage to the differential amplifier at which the diode conducts is the voltage drop across the series sensing resistor and the forward drop of the diode, and is selected to break down lower than the Zener breakdown of the input electrodes of the transistor tending toward reverse-biased conduction due to unbalance following crossover into the current mode. Of course, the diode breakdown conduction condition is not achieved under usual operation in the voltage regulation mode. In this manner, the reverse-biased transistor of the differential amplifier is prevented from reaching breakdown conduction due to operation during high reference voltage or low output voltage operation in the current mode. After such unbalance on the voltage mode differential amplifier of the power supply has been reduced by conduction of said diode, the power supply continues to regulate the output current at the same level as existed prior to diode conduction.

In its broader aspects, the invention contemplates a conducting device, such as for example, a diode, for completion of a bypass or breakdown path in a current regulated power supply for dissipation of excessive voltages normally tending to initiate voltage breakdown in associated control devices or amplifiers and resulting in unwanted current flow through the current sensing resistor. The resulting bypass current is made to flow in a breakdown path which excludes or bypasses the current sensing resistor by feeding the current to the unregulated side of the current sensing resistor.

BRIEF DESCRIPTION OF THE DRAWINGS

For a better understanding of the present invention, together with other and further objects thereof, reference is made to the accompanying drawing in which.

DESCRIPTION OF THE PREFERRED EMBODIMENT

Figure 1:
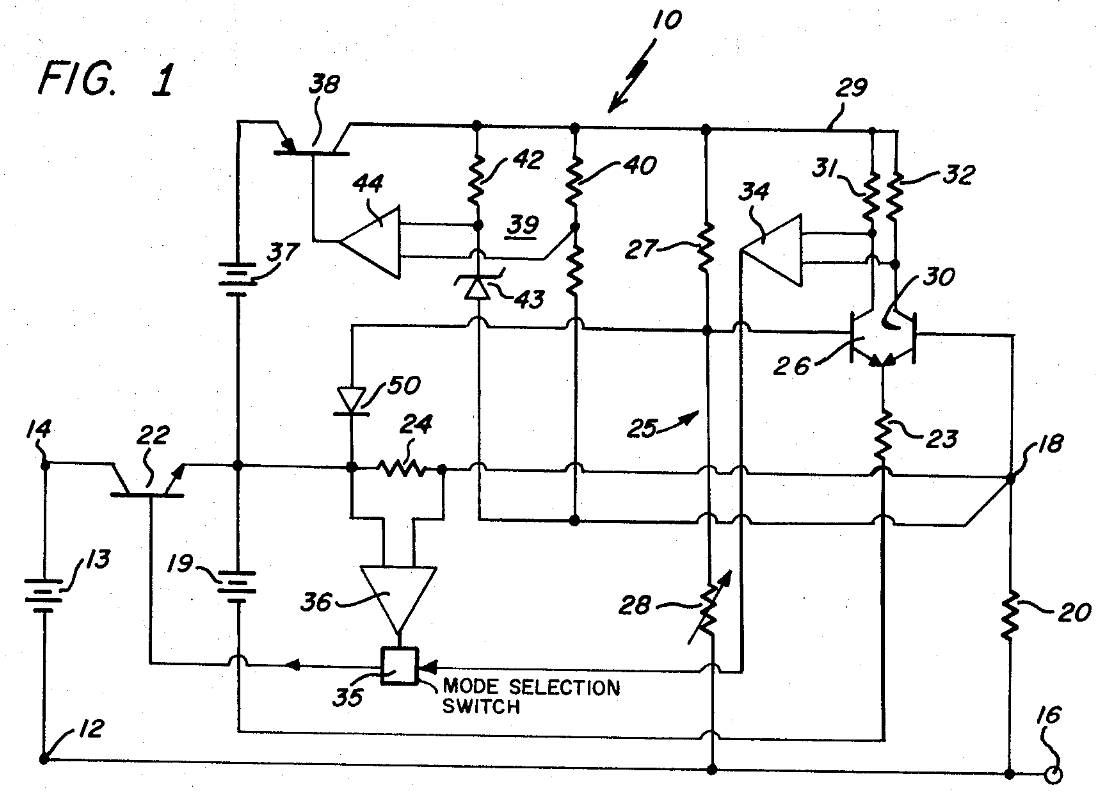
FIG. 1 is a schematic drawing of a transistorized voltage-current regulating circuit employing the protective circuit of the present invention.

Referring now to FIG. 1, there is shown a voltage regulating circuit 10 having negative input terminal 12 and a positive input terminal 14 adapted to receive a source of unregulated, unidirectional voltage, such as shown by source 13. The regulating circuit 10 is provided with a negative output terminal 16 and a positive output terminal 18 for supplying regulated output voltage to a load, represented as resistor 20, The negative input terminal 12 is connected to the negative output terminal 16.

A series transistor or series regulator 22 has its collector connected to the positive input terminal 14 and its emitter connected through a series current sensing resistor 24 to positive output terminal 18. The series transistor 22 may be considered a variable impedance whose impedance is controlled by a signal on its base electrode.

Means are provided to sample the amplitude of the output voltage between the terminals 16 and 18 and to feed the sampled voltage back degeneratively to the base of the transistor 22 to vary its impedance with the amplitude of the output voltage. To this end, a voltage divider 25 is connected between output terminal 16 and output terminal 18 by way of a fixed reference voltage applied across lead 29 and terminal 18. A sample of the output voltage is sensed by transistor 26, the base input of which is connected to the junction of sensing resistor 27 and variable resistor 28 in voltage divider 25. The sensing resistors 27 and 28 for the voltage mode assure that the output voltage, $+E_o$, with respect to ground is of such a value that $+E_o$ is to the reference voltage $E_{ref}$ as the resistance of resistor 28 is to that of resistor 27.

The emitter of transistor 26 is connected to the emitter of transistor 30 and the transistors 26 and 30 are connected to each other in a differential amplifier circuit. The collectors of transistors 26 and 30 are connected, respectively, through load resistors 31 and 32 to terminal 29 which is a source of positive reference voltage. The base of transistor 30 is connected to positive output terminal 18. The emitters of transistors 26 and 30 are connected by a common emitter resistor 23 to a source of negative bias voltage 19. This source of negative voltage 19 is connected to the input side of sensing resistor 24. The output from transistors 26 and 30 which appears as a voltage mode control signal on the collectors is amplified in a conventional amplifier 34, the output of which is fed to the base of the passing transistor 22 by way of a channelling device 35 which operates as a current mode-voltage mode selection device. This selection device 35 can be, for example, a well-known exclusive "OR" circuit adapted to accept one but not the other of the voltage are current mode control signals. A current mode amplifier 36 senses the voltage drop across sensing resistance 24, the output of which is the current mode control signal applied to channelling or switching device 35.

Also shown in FIG. 1 is a fixed reference supply comprising a source of unregulated voltage 37 connected to a series pass transistor 38 which is connected to a well-known bridge circuit 39 comprising bridge resistors 40, 41, 42 and Zener reference diode 43 to provide a voltage sensing signal to voltage sensing amplifier 44. The output of amplifier 44 is used to control the conduction of passing transistor 38 thereby providing a fixed reference voltage across terminal 18 and lead 29.

In operation, the application of a heavy load across terminals 16 and 18 changes the input to device 35 in a well-known manner and initiates crossover to the current mode. The voltage at the junction of resistors 27 and 28 rises by voltage divider action so as to make the base of transistor 26 more positive with respect to its emitter and more positive than the base of transistor 30, in effect providing forward bias on transistor 26 and reverse bias on transistor 30. It should be understood that in the voltage mode, the base-to-base voltage on differential amplifier transistors 26 and 30 is balanced and at zero potential, and whenever the current mode takes over, the differential amplifier can no longer correct the output voltage to effect a balance. If the emitter-base junction of transistor 30 arrives at Zener breakdown, current flows in the path including resistor 27, the base-emitter path of transistor 26, the emitter-base path of transistor 30, resistor 24 and then through voltage source 37 and the emitter-collector path of transistor 38.

This current flow constitutes an unwanted signal current through series current sensing resistor 24 which is sensed and acted upon by the current mode amplifier 36 to change the impedance of series or passing transistor 22 to correct the voltage across resistor 24, thereby degenerating the current in the output load circuit. In accordance with the invention, a semiconductor device, such as diode 50, is connected between the base of differential amplifier transistor 26 and the input side of series sensing resistor 24. Voltage which has builtup at the base of transistor 26 is now limited by conduction of diode 50. The resulting current is fed by diode 50 to the input side of the series sensing resistor 24 so that it is net sensed. In addition, the sum of the voltage drops across resistor 24 and diode 50 does not permit the voltage across the emitter-base of transistor 30 to reach Zener breakdown. That is to say, diode 50 is selected so as to break down prior to a breakdown of differential amplifier transistor 30.

Figure 2:
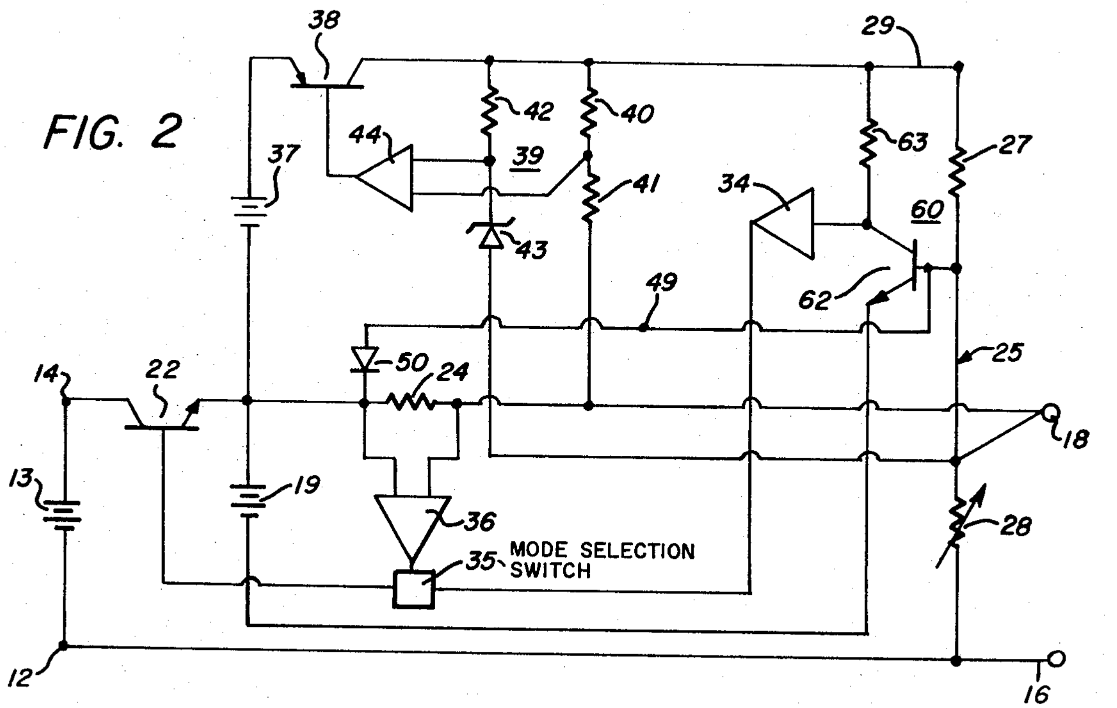
FIG. 2 is a schematic diagram of another embodiment of the invention.

Referring now to FIG. 2, there is shown a circuit having similar functions and components as the circuit shown in FIG. 1 except that the differential amplifier circuit for regulation in the voltage mode is somewhat modified. Corresponding parts in FIGS. 1 and 2 bear the same numbers. In place of the differential amplifier using transistors 26 and 30, a single-ended amplifier 60 utilizes transistor 62, the base of which is connected to the voltage divider 25 at the junction of resistors 27 and 28 to sense a sample of the output voltage. The emitter of transistor 62 is connected to the positive output terminal of the power supply by way of the negative bias source 19 and resistor 24. The output of the single-ended transistor 62 which appear on its collector at the junction of load resistor 63 is connected to amplifier 34 and applied to the base of the pass transistor 22 by way of the channelling or selection device 35. In the present embodiment, when a heavy load initiates crossover to the current mode, the positive voltage on the base of transistor 62 rises with respect to its emitter. However, before voltage can build up high enough to initiate base-emitter Zener breakdown, diode 50 conducts and, as described in connection with FIG. 1, feeds the resulting current by way of lead 49 to the input side of series sensing resistor 24 so that this unwanted current is not sensed. Diode 50 is selected as previously described so as to break down before the voltage across the emitter-base of transistor 62 reaches Zener breakdown. The breakdown voltage of diode 50 is also selected to be higher than the forward base-emitter bias voltage of transistor 62 when the power supply is operating in the voltage mode; thus the diode 50 does not interfere with normal operation. In this manner, the invention permits the value of the reference voltage to be increased without danger of current mode regulation degeneration, thereby providing a better temperature coefficient and improved performance.

Figure 3A:
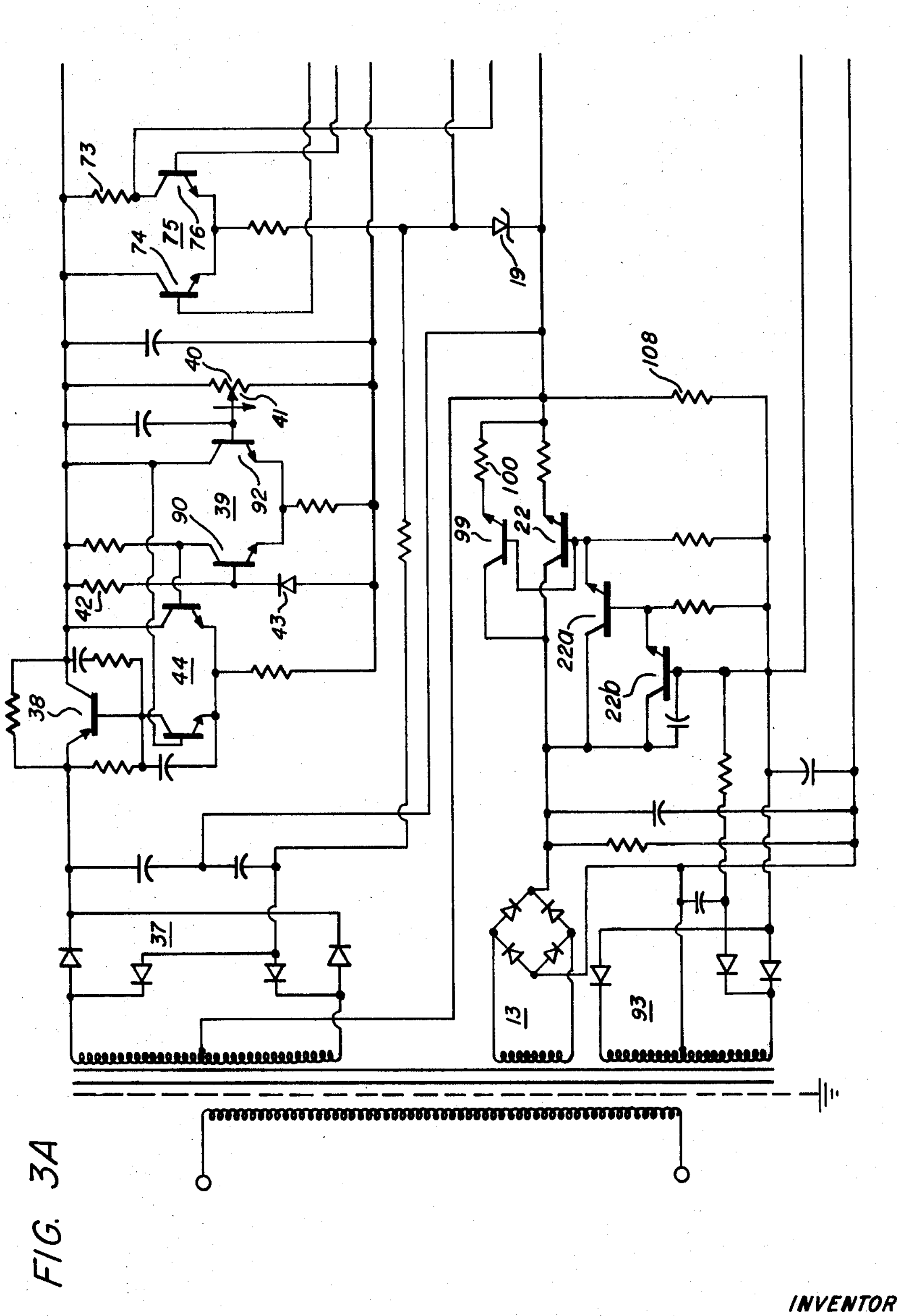
FIGS. 3A and 3B are a complete schematic circuit in accordance with the form of the invention shown in FIG. 1 but with added details.
Figure 3B:
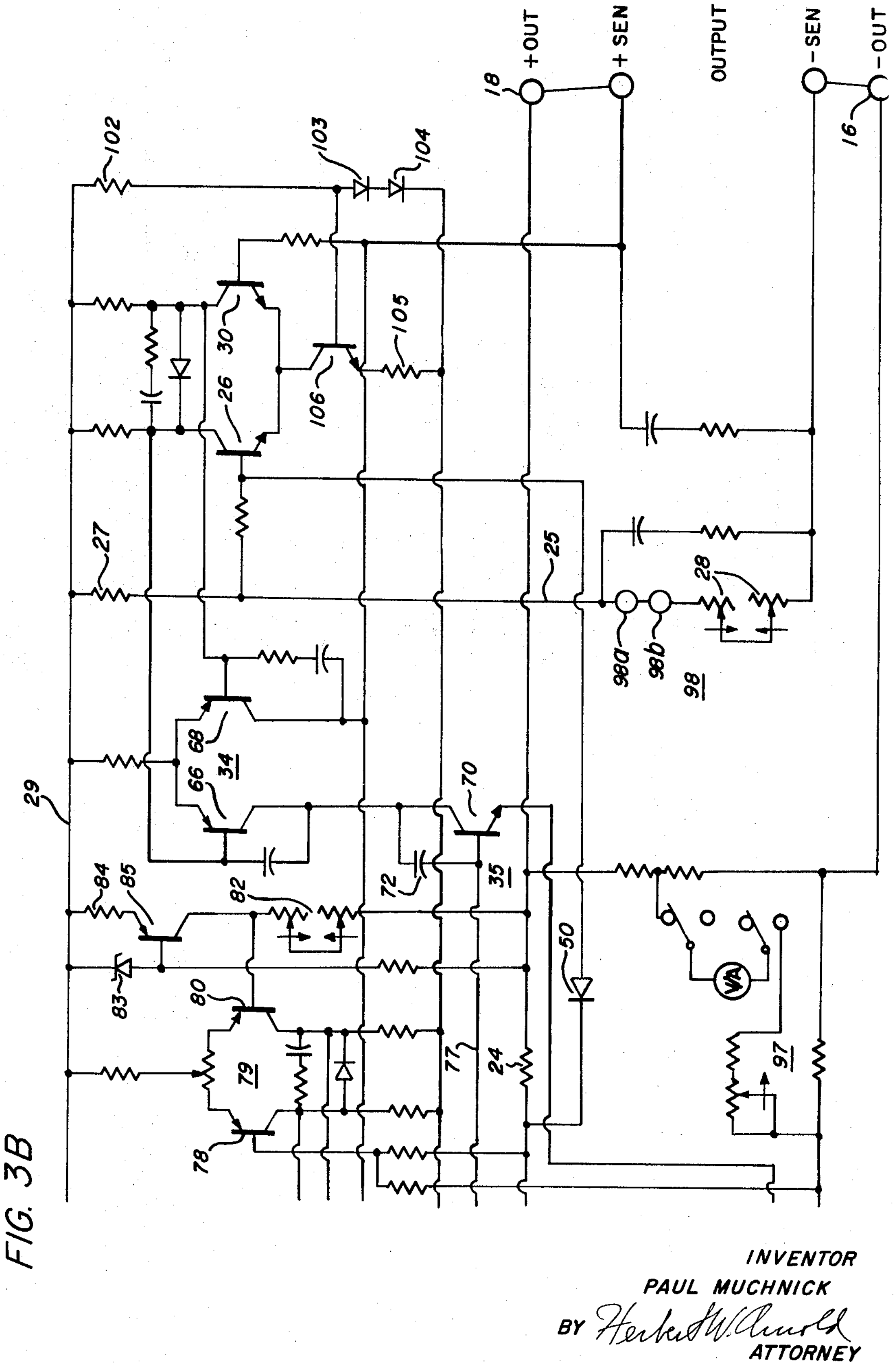

FIGS. 3*a* and 3*b* taken together make up a complete detailed schematic circuit of a power supply having the form of FIG. 1. In this figure the corresponding parts in FIGS. 1 and 2 bear the same numbers. Since the operation of the circuit of FIGS. 3*a* and 3*b* will thus be clear from the above description of FIG. 1, only the additional means for amplifying the output of the differential amplifiers, the channel circuit means, and the amplifiers for the series transistor here shown in complete form will be described. In particular, unregulated voltage source 13 of FIG. 3A is connected to series pass transistor 22 and to output terminals 16 and 18 of FIG. 3B. Transistor 22 is fed from a conventional Darlington amplifier including serially connected transistors **22*a* and 22*b* in order to amplify the control signal in the voltage mode from differential amplifier transistors 26 and 30. This control signal is applied to transistors 22*a* and 22*b* by way of an additional voltage mode amplifier stage 34 including transistors 66 and 68 and channelling or selection device 35 which includes transistor 70 and stabilizing capacitor 72. This capacitor provides the necessary feedback for stabilization in the current mode. In this mode, transistor 70 acts in a linear mode, as a variable impedance to control the current flowing through its emitter. It should be noted that in the voltage mode, transistor 76 is in a cut off condition, causing a large positive voltage from lead 29 to be impressed on the base of transistor 70 through resistor 73 thus driving transistor 70 into a saturated condition and therefore permitting no hindrance to current flow from voltage mode amplifier 34. Transistors amplify the current mode control developed rom the current mode differential amplifier 79. The voltage drop across sensing resistor 24 in conjunction with a reference voltage developed across resistor 82 is applied to transistor 78 and 80 to provide an unbalance of the current mode differential amplifier 79 in which output developed at the collector of transistors 78 and 80, respectively, rises and falls. This differential output is connected respectively to the base inputs of transistors 74 and 76 in amplifier 75. The output of transistor 76 developed at its collector is applied by way of lead 77 to the channelling device 35 to take over control of the series pass transistor 22 and initiate control in the current mode in response to heavy load current. In accordance with the invention, diode 50 conducts prior to the aforementioned buildup of a breakdown voltage at the base of transistor 26 and the resulting unwanted current is fed to the input side of sense resistor 24**.

Also shown in FIG. 3 is a source of unregulated voltage 37 which supplies the necessary power for the reference power supply whose output appears between lead 29 and terminal 18. Source 37 also supplies the necessary voltage for developing a bias voltage across Zener diode

19. The reference power supply output is controlled by pass transistor 38 in response to control signals from the sensing network 39 and conventional driver amplifier 44. Transistors 90 and 92 have been added to amplify the sensing signal and tansmit it to amplifier 44. Additionally, bias power source 19 provides bias potentials for the voltage and current mode amplifiers and the series pass transistors. Zener reference diode 19 supplies a negative regulated voltage source for the voltage and current mode control amplifiers. Also, a conventional meter circuit 97 and programming input circuit 98 is shown for introducing when desired rapid program control of the power supply program and does not form a part of the present invention. The programming resistance or signal is injected at terminals **98*a* and 98*b***.

The terminals + Sense and − Sense are for the purpose of externally sensing output voltages from terminals 16 and 18 at remote equipment locations, in which case the shown connections are omitted and connected at the desired location. In addition, series transistor 22 is connected in parallel in a known manner with transistor 99 and reistor 100 for increasing power-handling ability.

The unregulated voltage source 93 is used to supply negative bias voltages for the passing transistors, the associated Darlington driver amplifiers **22*a* and 22*b*, as well as minimum load resistor 108. The network comprising resistor 102, diodes 103 and 104, resistor 105 and transistor 106 forms a well-known constant current device whereby the total emitter current of the differential amplifier transistors 26 and 30 is held constant. In like manner, Zener diode 83 in conjunction with resistor 84 and transistor 85 provides a constant current source for developing a reference voltage across resistor 82**.

From the above description and drawings it will be evident that an overvoltage protective diode circuit has been described which can be used in connection with a voltage regulating circuit without interfering with its normal operation. The protective circuit operates only after a voltage buildup has occurred.

The foregoing disclosure and drawings are merely illustrative of the principles of the invention and are not to be interpreted in a limiting sense. The only limitations will be determined from the scope of the appended claims.

What is claimed is:

1. A current regulated power supply comprising a pair of load terminals for connecting a load to be supplied with regulated current, an output voltage sensing amplifier and an output current sensing amplifier, a reference voltage source connected to apply a fixed reference voltage to a voltage sensing input of said voltage sensing amplifier, a series pass transistor connected to an input terminal of said power supply, the control electrode of said series pass transistor being fed by the output of said voltage sensing amplifier, a series sensing impedance connected in series with said series pass transistor and a load terminal, means for applying voltage developed across said series sensing impendance to the input of said current sensing amplifier, means for connecting the output of said current sensing amplifier to the control electrode of said series pass transistor, and a diode connected from the voltage sensing input of the voltage sensing amplifier to the input side of said series sensing impendance in a manner so that upon diode conduction in response to buildup of amplifier input voltage, current flows from said voltage sensing input to the input side of the series sensing impedance to bypass away from said impendance current due to reverse bias voltage developed at the input of said voltage sensing amplifier.

2. A current regulated power supply as set forth in claim 1 in which the output voltage sensing amplifier is a differential amplifier.

3. A current regulated power supply as set forth in claim 1 in which the output voltage sensing amplifier is a single-end amplifier.

4. A voltage protective circuit for a power supply comprising a voltage-current regulator circuit which includes series regulating means, a current sensing resistance, a voltage sensing circuit coupled to a load circuit, a differential amplifier coupled between the voltage sensing circuit and a control input of said series regulating means, said series regulating means connected to an input terminal of said power supply, said current sensing resistance connected in series with said series regulating means and said load circuit, and a unidirectional current device connected from a junction of the sensing circuit feeding said differential amplifier to the input side of said current sensing resistance to bypass reverse bias voltage at the input of said differential amplifier away from said sensing resistance when the voltage across said unidirectional current device initiates conduction.

5. A voltage protective circuit as set forth in claim 4 wherein the series regulating means is a transistor.

6. A voltage protective circuit as set forth in claim 4 wherein said differential amplifier includes transistors and said unidirectional current devices is a diode having lower Zener breakdown characteristics than said transistors.

7. A regulated output power supply comprising a power source to be current regulated, a pair of load terminals for connecting a load to be supplied with regulated current, a differential amplifier including a plurality of transistors, each having base, emitter and collector electrodes, means for applying an output sampling voltage to the base electrode of one transistor of said amplifier, a series pass transistor connected to an input terminal of said power supply, a control electrode of said series pass transistor being fed by signals from the differential amplifier, a sensing impedance device connected in series with said series pass transistor and a load terminal, means for applying a control signal developed by said sensing impedance device to said control electrode of said series pass transistor, and a diode connected between the base of the transistor to which said sampling voltage is applied in said differential amplifier and the input side of said sensing impedance device and adapted to conduct in response to voltage tending to reverse bias one of said transistors of said differential amplifier.

8. A current regulated power supply as set forth in claim 7 in which the differential amplifier includes semiconductor devices which tend toward voltage breakdown in the presence of an elevated voltage applied across their electrodes.

9. A current regulated power supply comprising a pair of load terminals for connecting a load to be supplied with regulated current, an output voltage sensing amplifier and an output current sensing amplifier, a reference voltage source connected to apply a reference voltage to a voltage sensing input of said voltage sensing amplifier, a series pass transistor connected to an input terminal of said power supply and adapted to supply regulated current to one load terminal, the control electrode of said series pass transistor being fed by the output of said voltage sensing amplifier, a series sensing inmpedance connected in series in the path of said regulated current and a load terminal, means for applying voltage developed across said series sensing impendance to the input of said current sensing amplifier, means for connecting the output of said current sensing amplifier to the control electrode of said series pass transistor, and a unidirectional current device connected from the voltage sensing input of the differential amplifier to one side of said series sensing impedance to bypass breakdown current away from said series sensing impedance in response to reverse bias voltage at the input of said differential amplifier, whereby current mode degeneration due to voltage developed across said series sensing impedance is prevented.

10. A current regulated power supply comprising a pair of load terminals for connecting a load to be supplied with regulated current, an output voltage sensing amplifier and an output current sensing amplifier, a reference voltage source connected to apply a reference voltage to a voltaging sensing input of said voltage sensing amplifier, an output regulating device connected to supply regulated current to one load terminal, the control electrode of said output regulating device being fed by the output of said voltage sensing amplifier, a series sensing impedance connected between said regulating device and a load terminal, means for applying voltage developed across said sensing impedance to the input of said current sensing amplifier, means for connecting the output of said current sensing amplifier to the control electrode of said output regulating device, and a diode connected to conduct current from the voltage sensing input of said voltage sensing amplifier to said series sensing impedance to bypass away from said series sensing impedance current due to voltage buildup at thme input of said voltage sensing amplifier.

11. A regulating power supply circuit comprising a voltage regulator circuit which includes a passing impedance, a sensing circuit coupled to a load circuit for producing a first error signal, a first amplifier coupled to a sensing circuit for amplifying the first error signal, said passing impedance connected in series with an input terminal, a series sensing impedance connected in series with said passing impedance and an output terminal, a second amplifier coupled to the output of said series sensing imepedance for amplifying a second error signal developed across said sensing impedance, means for selectively applying said first and second error signals to control the conductivity of said passing impedance in response to current through said series sensing impedance, and a unidirectional current device coupled between the input to said first amplifier and the input side of said series sensing impedance in a manner adapted to bypass away from said sensing impedance current resulting from breakdown voltage buildup at the input to the first amplifier.

12. A regulated power supply comprising a regulating device connected in series with the input circuits of the power supply, an amplifier circuit operative to produce error signals representative of variations in output potential, means for coupling said error signals to vary the impedance of said regulating device, a series sense impedance connected in series with the regulating device and output circuits of said power supply, a non-linear device connected to conduct in response to elevated voltage prior to reverse bias breakdown at an input of amplifying devices in said amplifier circuits, said non-linear device connected between the input of said amplifier circuit and the input side of said series impedance, and means for coupling error signals representative of variations in current through said series impedance to vary the conductivity of said regulating device.

References Cited

UNITED STATES PATENTS

| | | | |
|---|---|---|---|
| 3,196,344 | 7/1965 | Walker. | |
| 3,371,269 | 2/1968 | Wattson | 321—18 X |
| 3,441,833 | 4/1969 | Bahrs et al. | 323—9 |

J. D. MILLER, Primary Examiner

A. D. PELLINEN, Assistant Examiner

U.S. Cl. X.R.

323—17, 20, 22, 38